United States Patent [19]
Dey

[11] Patent Number: 5,438,672
[45] Date of Patent: Aug. 1, 1995

[54] MICROCONTROLLER EMULATOR FOR PLURAL DEVICE ARCHITEVTURE CONFIGURED BY MODE CONTROL DATA AND OPERATED UNDER CONTROL CODE TRANSMITTED VIA SAME SWITCHING BUS

[75] Inventor: Shankar Dey, San Jose, Calif.

[73] Assignee: National Semiconductor Corporation, Del.

[21] Appl. No.: 113,526

[22] Filed: Aug. 26, 1993

Related U.S. Application Data

[63] Continuation of Ser. No. 629,478, Dec. 18, 1990, abandoned.

[51] Int. Cl.⁶ .............................................. G06F 19/00
[52] U.S. Cl. ................................. 395/500; 364/232.8; 364/232.9; 364/232.91; 364/DIG. 1; 364/949.4; 364/DIG. 2; 395/800
[58] Field of Search ................ 395/425, 500, 800, 325

[56] References Cited

U.S. PATENT DOCUMENTS

| | | | |
|---|---|---|---|
| 4,200,915 | 4/1980 | Struger et al. | 364/900 |
| 4,553,224 | 11/1985 | Struger et al. | 364/900 |
| 4,639,852 | 1/1987 | Motomiya | 364/138 |
| 4,884,195 | 11/1989 | Endo | 364/200 |
| 5,062,034 | 10/1991 | Bakkar | 364/200 |
| 5,068,823 | 11/1991 | Robinson | 395/500 |
| 5,118,968 | 6/1992 | Douglas et al. | 307/362 |
| 5,134,691 | 7/1992 | Elms | 395/200 |
| 5,265,234 | 11/1993 | Ogura et al. | 395/425 |
| 5,301,344 | 4/1994 | Kolchinsky | 395/800 |
| 5,329,470 | 7/1994 | Sample et al. | 364/578 |

Primary Examiner—Ken S. Kim
Attorney, Agent, or Firm—Limbach & Limbach; H. Donald Nelson

[57] ABSTRACT

A configurable emulator system for emulating a microcontroller device architecture selected from a plurality of microcontroller device architectures is provided. The configurable emulator includes a master microcontroller emulator comprising at least one functional block that responds to a mode select input signal for designating the functional block as having a desired integrated circuit feature. The master microcontroller emulator includes means responsive to control code for executing the control code. A configuration mode selector responds to an external input signal by asserting a configuration flag. Bus selector means responds to the assertion of the configuration flag by transferring configuration data provided at a bus selector input to a configuration data output. The bus selector transfers control code provided at the bus selector input to the master microcontroller emulator via a control code output when the configuration flag is not asserted. The emulator system includes at least one configuration latch/decoder that responds to the configuration data provided at the configuration data output by providing the mode select input signal to the at least one functional block.

3 Claims, 17 Drawing Sheets

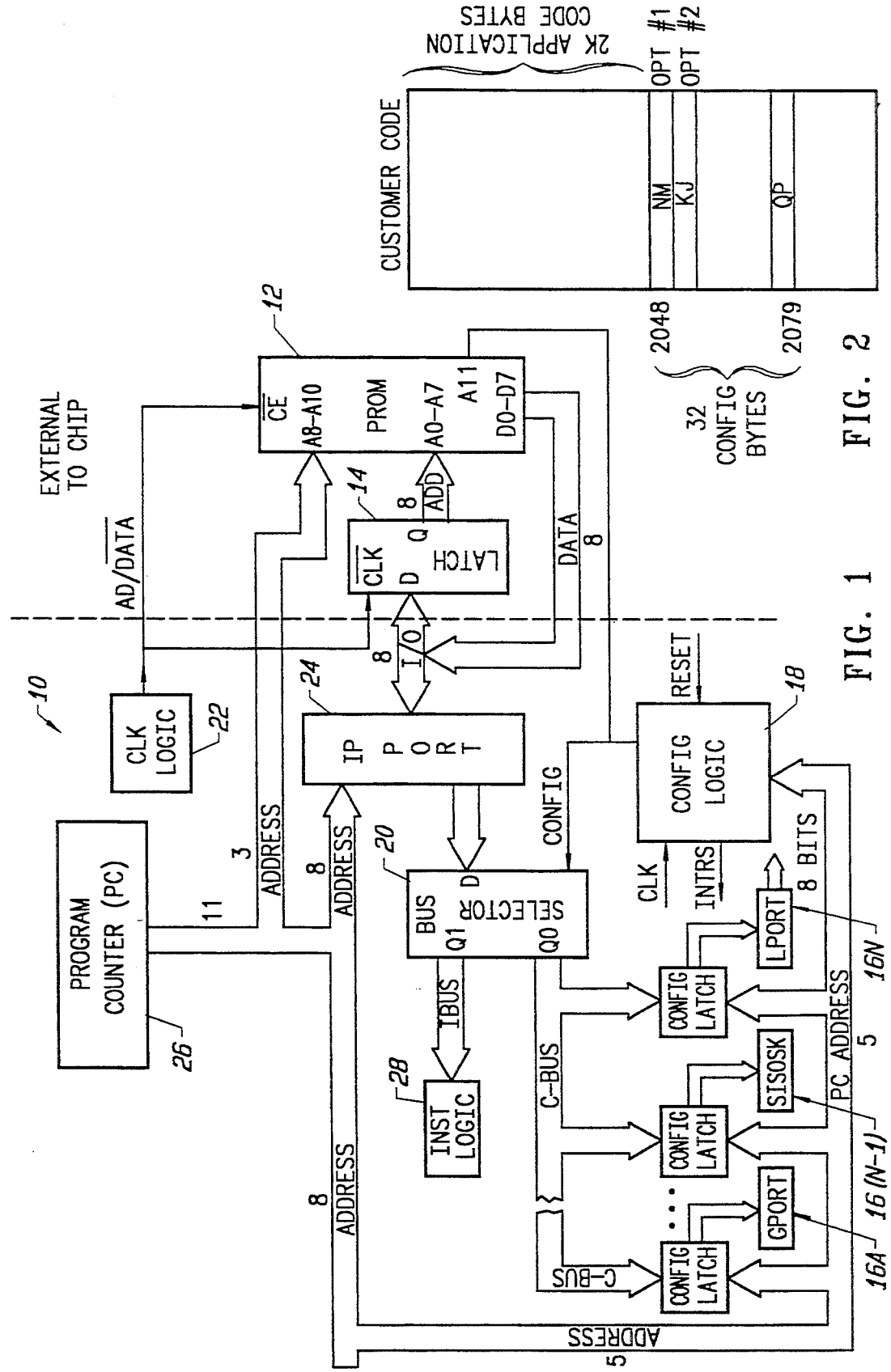

MICROCONTROLLER EMULATOR FOR PLURAL DEVICE ARCHITEVTURE CONFIGURED BY MODE CONTROL DATA AND OPERATED UNDER CONTROL CODE TRANSMITTED VIA SAME SWITCHING BUS

This is a continuation of application Ser. No. 07/629,478 filed on Dec. 18, 1990, now abandoned.

BACKGROUND OF THE INVENTION

1. Field of the Invention

The present invention relates to microcontrollers and, in particular, to an emulator system that is configurable to provide full emulation for a variety of microcontroller architectures.

2. Discussion of the Prior Art

A microcontroller is a flexible data processing device that can be programmed for use in any one of a variety of control applications.

There are three general categories of control operations in which a microcontroller .can be used: device control, data control and process control. In a device control operation, the microcontroller sequences a tool or computer peripheral through a series of operations. In a data control operation, the microcontroller moves data from one or more sources to one or more destinations. In a process control operation, the microcontroller receives inputs from measured process variables and uses the inputs to control the process in a closed-looped system.

A typical microcontroller is a complete microcomputer system which is integrated in a single semiconductor chip. That is, a microcontroller integrated circuit includes a central processing unit (CPU) for processing data, random access memory (RAM) for providing read/write working data storage for the CPU, a timing system for controlling the operations of the microcontroller and an interrupt system for controlling communications between the microcontroller and its associated external peripheral devices. In addition, and relevant to the focus of the present invention, a microcontroller includes a user-programmable read only memory (PROM) that stores the microcode (control code) for the particular control application algorithm to be performed by the microcontroller. The control PROM is permanently programmed with the user's microcode during the fabrication of the microcontroller.

Before the user's microcode is built into the microcontroller, it is desirable to verify the functionality of the code. Typically, an emulator device and a development system are utilized for this purpose. The emulator device provides all of the hardware functionality available in the microcontroller and, in addition, is capable of accessing external program memory. The development system provides the external program memory that stores the user's microcode. The development system also includes test mechanisms for debugging the user's microcode.

The problem has been that each variation in microcontroller architecture requires its own individual emulator. For example, integrated circuit manufacturers may provide a family of microcontroller products, thus offering different versions of a basic microcontroller architecture for different price-to-performance applications. Different members of the microcontroller product family may vary in the size of internal ROM and RAM memories. More expensive devices in the family may have a larger instruction set than less expensive devices. Some members of the family may utilize NMOS technology, while others may utilize low power CMOS technology. There may even be internal architectural differences among the devices, e.g. internal register bit definitions, stack behaviors, etc. Thus, to accommodate these differences, a separate emulator device is required for each individual product in the microcontroller family.

Even with the use of these dedicated emulators, a particular emulation may fall short of 100% emulation if the off-the-shelf emulator utilizes a different set of circuit options, for example, in its inputs and outputs, versus the customer's selection of input/output options.

SUMMARY OF THE INVENTION

The present invention provides an emulator system for configuring a "master" emulator device to selectively emulate any one of a number of different microcontroller architectures.

The emulator configuration system responds to information received from a programmable memory element that is subdivided for storing both control code and the configuration data that is utilized to configure the emulator system. The programmable memory element responds to an input address applied at its address input port by providing the contents of a corresponding storage location at its data output port. A bus selector, connected to the data port via a data bus provides information characters received from the data bus to a configuration bus via a first bus selector output port when a configuration flag is set; the configuration flag signals the programmable memory element that the current access is to configuration data. The bus selector provides information characters received at its data input port to an instruction bus via a second bus select output port when the configuration flag is not set; if the configuration flag is not asserted, then the current access to the programmable memory element is to control code. Configuration logic responds to an external reset signal by setting the configuration flag. A number of configuration latches/decoders connected to the configuration bus store the configuration data provided on the configuration bus. The configuration latches are loaded by a program counter that provides input addresses corresponding to the configuration data storage locations on the address bus when the configuration flag is set. Each of the configuration latches/decoders responds to the configuration data input by configuring its output pins to represent a particular microcontroller architecture feature. The configuration latch/decoder outputs set various architecture options of a "master" microcontroller emulator.

Thus, a configurable emulator system in accordance with the present invention provides full emulation for a variety of microcontroller architectures, as compared to conventional emulator systems that provide only a minimal set of options.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIG. 1 is a block diagram illustrating a configurable emulator system in accordance with the present invention.

FIG. 2 is a memory map illustrating PROM storage allocation for the configuration bytes utilizable by a configurable emulator system in accordance with the present invention.

FIGS. 4A and 4B1, 4B2, and 4B3 combine to provide a logic diagram illustrating configuration logic utilizable in the FIG. 1 emulator system.

DETAILED DESCRIPTION OF THE INVENTION

Figure 4A:
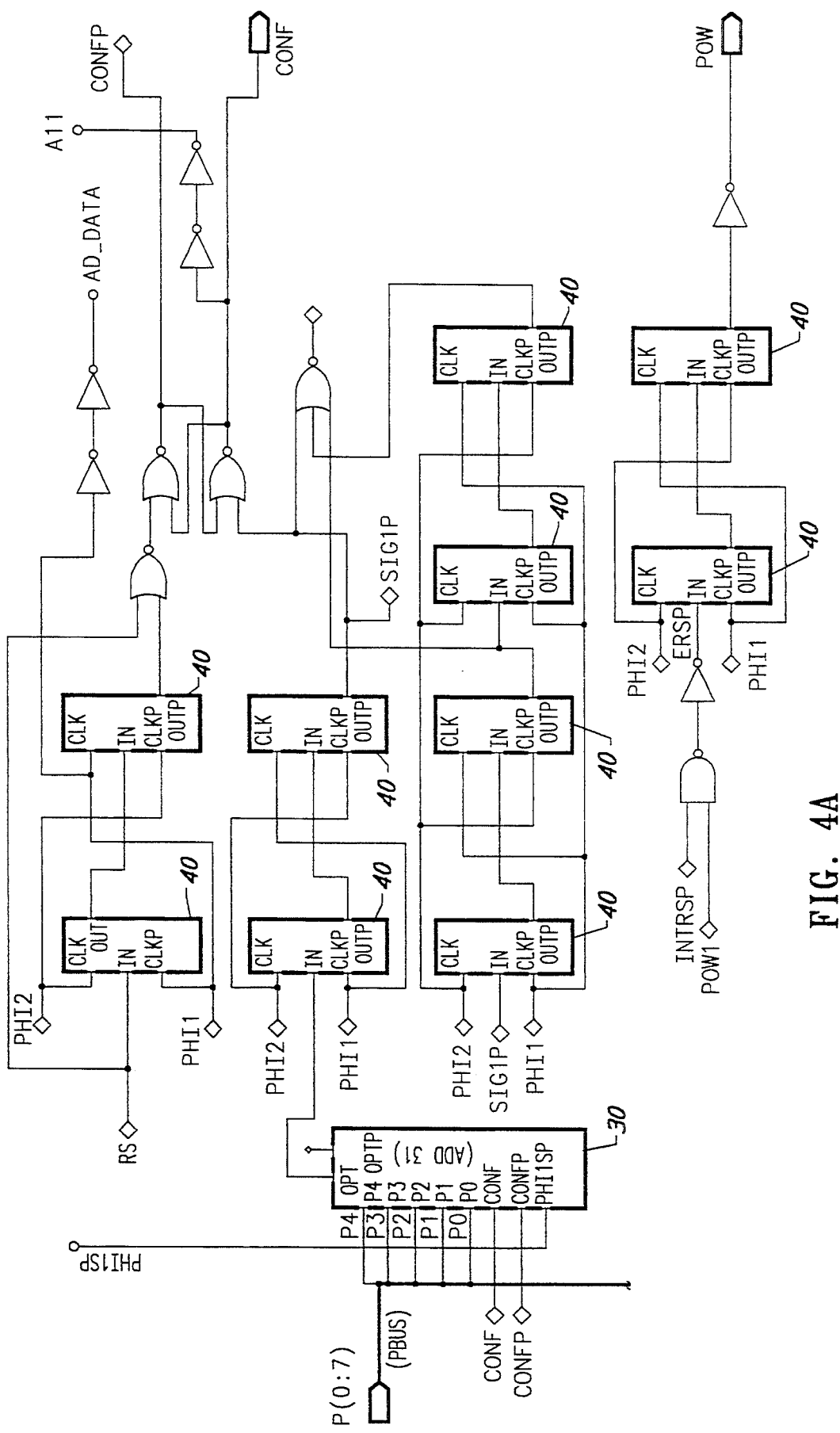
Figures 1, 4B:
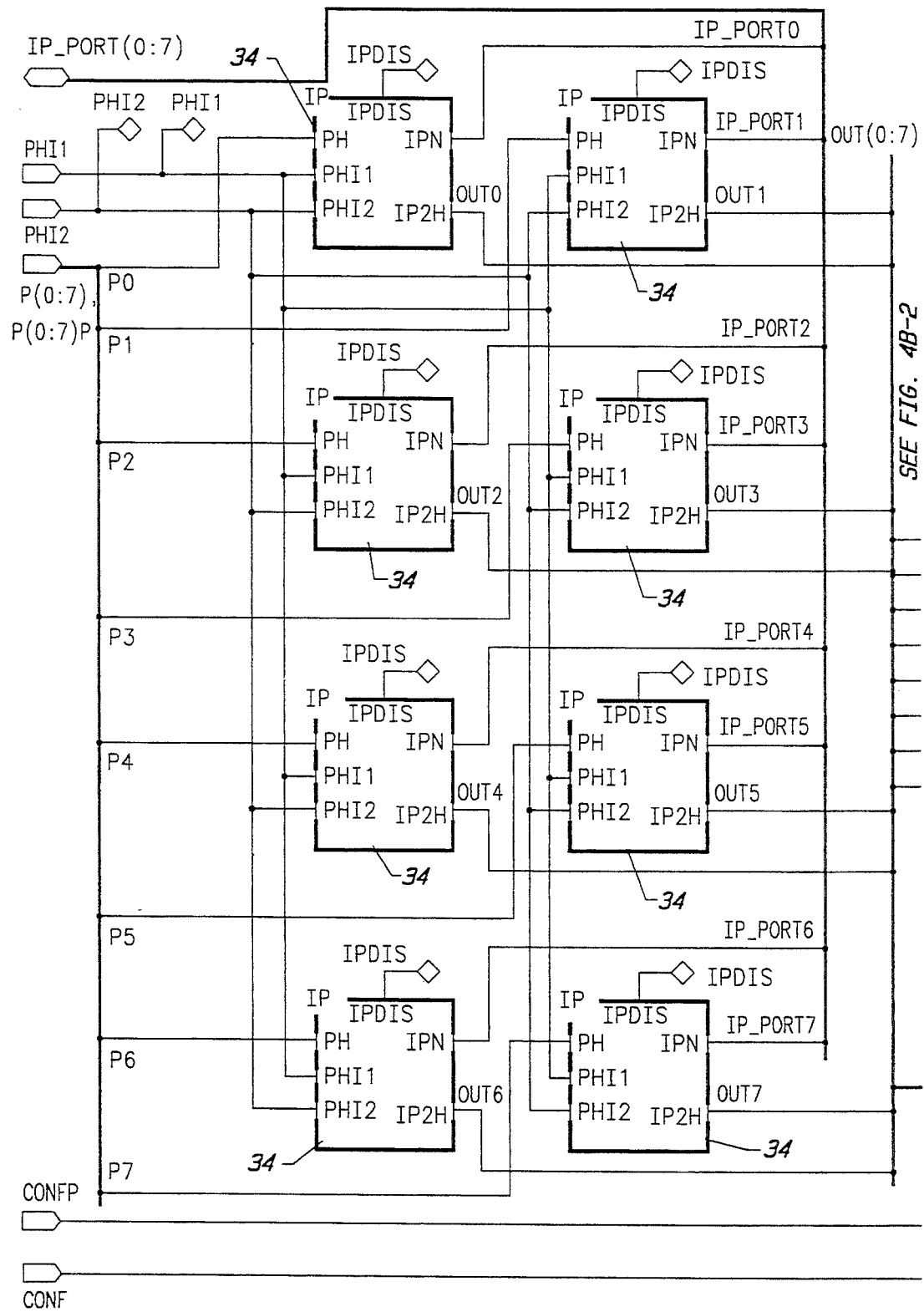

FIG. 1 shows a block diagram of an emulator configuration system 10 in accordance with the present invention. The emulator configuration system 10, shown on the left-hand side of the dashed line in FIG. 1, accesses a programmable read only memory (PROM) device 12 via address latch 14. In the illustrated embodiment, both PROM 12 and address latch 14 are external to the integrated emulator configuration system 10.

PROM 12 stores 8-bit (byte-wide) information characters. PROM 12 is subdivided into a control code section of storage locations for storing user control code for testing using the emulator configuration system 10 and a configuration data section of storage locations for storing configuration data utilizable for configuring a "master" emulator device in any one of a number of microcontroller architectures.

Figures 2, 4B:
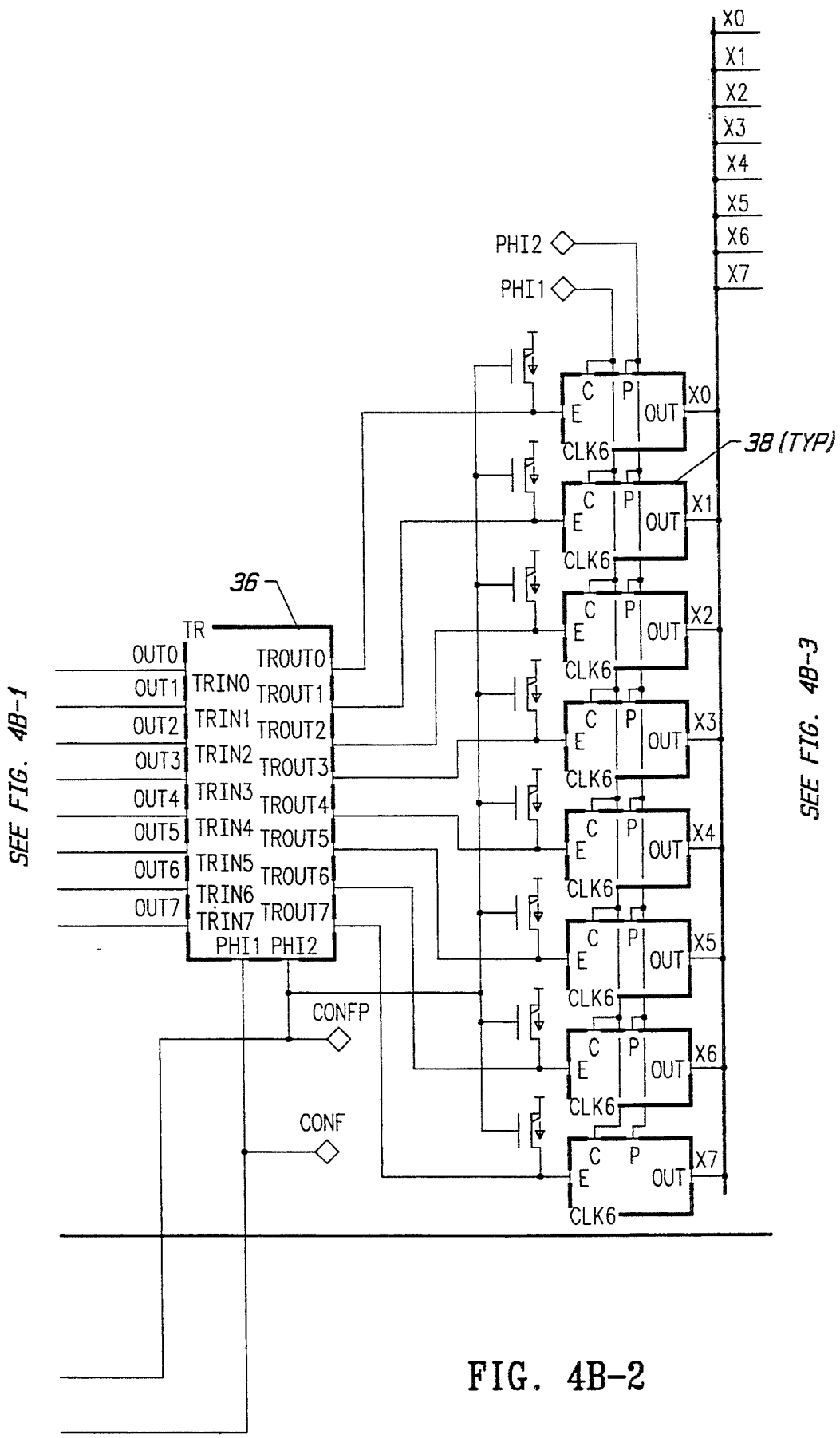
Figures 3, 4B:
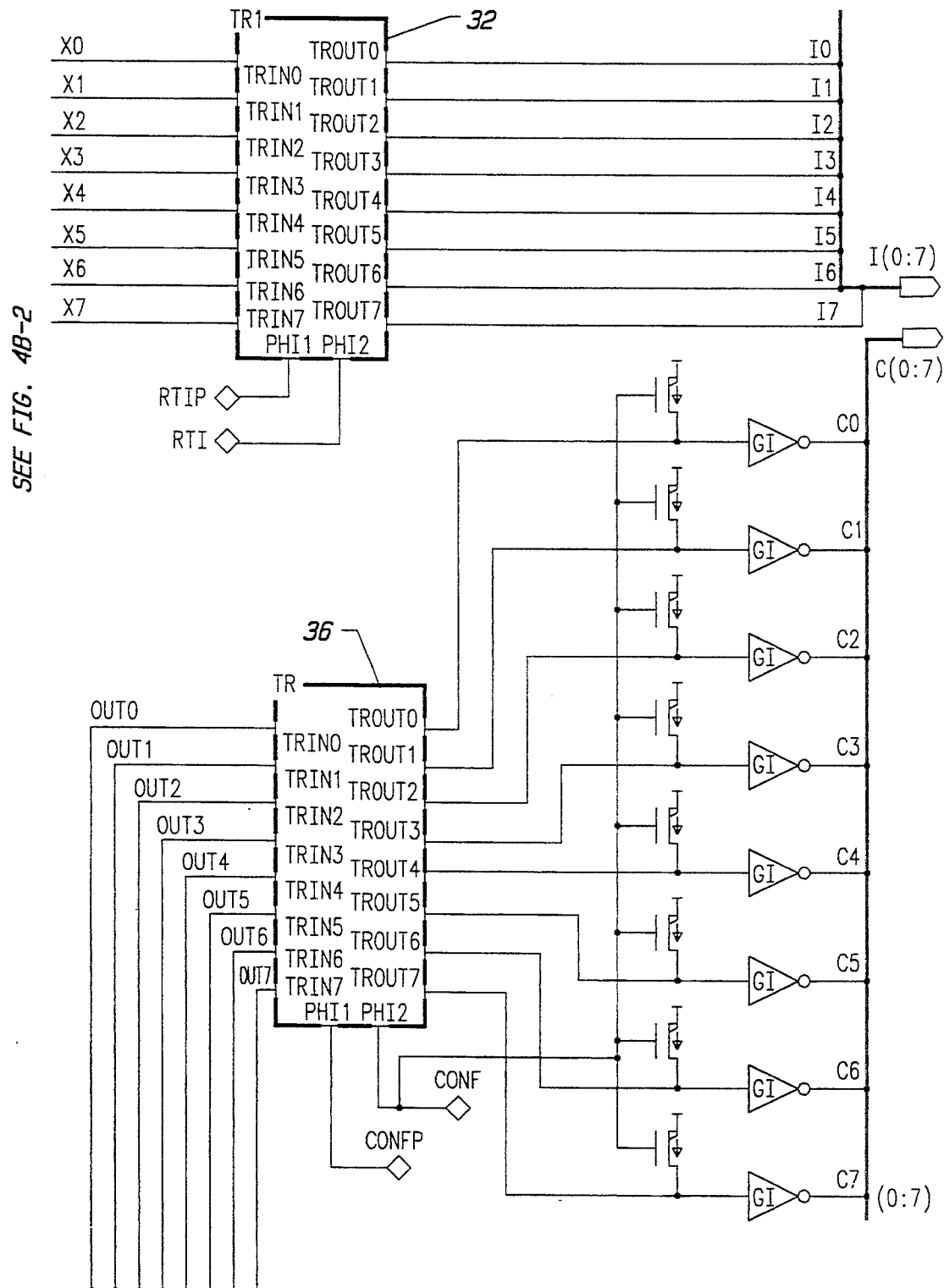

As shown in FIG. 2, PROM 12 allows for thirty-two memory-mapped storage locations in PROM 12 to store the configuration data.

The master emulator device is configured by providing multi-bit configuration data to a number of configuration latches/decoders, such as the configuration latches/decoders 16A–16N shown in FIG. 1. The configuration latches/decoders are single bit memory elements that store the configuration data. Each configuration bit in turn provides a control signal to mode select input pins that control corresponding logic blocks of the master emulator device to determine its architectural features (e.g., stack-behavior, or a size feature like RAM or ROM size, or an input/output parametric feature like Standard output versus push/pull output, NMOS versus CMOS, and so on).

For example, Table I below shows the data for each configuration latch/decoder 40 utilized in each LIO block 42 for each L-port pin versus the feature that those bits will produce on that L-port. Similarly, Table II below shows the bit patterns for the SISOSK port and Table III shows the bit patterns for the G-port.

TABLE I

| | Configuration Option List | | | | | | | | | | |
|---|---|---|---|---|---|---|---|---|---|---|---|
| | | | | L LATCH NOS. | | | | | | | |
| L INPUT/OUTPUT PORT | PD1 | PD2 | PD3 | L0 | L1 | L2 | L3 | L4 | L5 | L6 | |
| OUTPUT OPTION | | | | | | | | | | | |
| Tri-State Push Pull | | | | 1 | 1 | 0 | 0 | 0 | X | X | CMOS |
| Low Source Current, Tri-State Push Pull | | | | 1 | 0 | 0 | 0 | 0 | X | X | CMOS |
| Open Drain, Tri-State Output | | | | 0 | 0 | 0 | 0 | 0 | X | X | CMOS |
| Std. Output | | | | 0 | 1 | 0 | 0 | 0 | X | X | NMOS |
| Open Drain Output | | | | 0 | 0 | 0 | 0 | 0 | X | X | NMOS |
| High Current LED | | | | 1 | 0 | 0 | 1 | 1 | X | X | NMOS |
| High Current, Tri-State Push Pull | | | | 1 | 1 | 1 | 0 | 0 | X | X | NMOS |
| Low Current LED | | | | 1 | 0 | 0 | 1 | 0 | X | X | NMOS |
| Low Current Tri-State | | | | 1 | 1 | 0 | 0 | 0 | X | X | NMOS |
| 12V Operation | NP | NP | P | | | | | | | | CMOS/NMOS |
| Normal Operation | P | P | NP | | | | | | | | CMOS/NMOS |
| INPUT OPTION | | | | | | | | | | | |
| No Wake-Up ON L | | | | X | X | X | X | X | X | 0 | |
| Wake-UP ON L | | | | X | X | X | X | X | X | 1 | |
| Std. TTL Input | | | | X | X | X | X | X | 0 | | |
| Higher Voltage Input Levels | | | | X | X | X | X | X | 1 | | |

TABLE II

| | Configuration Option List | | | | | |
|---|---|---|---|---|---|---|
| OPTION | PD1 | PD2 | PD3 | L0 | L1 | |
| SO/SK OUTPUT PORT | | | | | | |
| Push Pull Outputs | | | | 1 | 1 | CMOS |
| Push Pull, Low Source Current | | | | 1 | 0 | CMOS |
| Open Drain Output | | | | 0 | 0 | CMOS |
| Std. LSTTL Output | | | | 1 | 0 | NMOS |
| Normal Operation | P | P | NP | | | CMOS/NMOS |

TABLE II-continued

| OPTION | Configuration Option List | | | | | |
|---|---|---|---|---|---|---|
| | PD1 | PD2 | PD3 | L0 | L1 | |
| 12V Operation | NP | NP | P | | | CMOS/NMOS |
| SI INPUT | | | | | | |
| Load to Vcc | | | | 1 | | CMOS/NMOS |
| Hi-Z Input | | | | 0 | | CMOS/NMOS |
| Std. TTL Input Levels | | | | | 0 | NMOS |
| Higher Volt. Input Levels | | | | | 1 | NMOS |
| Normal Operation | P | P | NP | | | CMOS/NMOS |
| 12V Operation | NP | NP | P | | | CMOS/NMOS |

TABLE III

| G INPUT/OUTPUT PORT | Configuration Olption List | | | | | | | | |
|---|---|---|---|---|---|---|---|---|---|
| | PD1 | PD2 | PD3 | L0 | L1 | L2 | L3 | L4 | L5 |
| OUTPUT OPTION | | | | | | | | | |
| Push Pull Output | | | | 1 | 1 | 0 | 0 | | CMOS |
| Push Pull Low Source Current | | | | 1 | 0 | 0 | 0 | | CMOS |
| Open Drain Output | | | | 0 | 0 | 0 | 0 | | CMOS |
| Push Pull High Sink Output | | | | 1 | 1 | 1 | 1 | | CMOS |
| Open Drain High Sink | | | | 0 | 0 | 1 | 1 | | CMOS |
| Very High Current Std. Output | | | | 0 | 1 | 1 | 1 | | NMOS |
| Very High Current Open Drain Output | | | | 0 | 0 | 1 | 1 | | NMOS |
| High Current Std. Output | | | | 0 | 1 | 0 | 1 | | NMOS |
| Std. LSTTL Output | | | | 1 | 0 | 0 | 0 | | NMOS |
| Open Drain LSTTL Output | | | | 0 | 0 | 0 | 0 | | NMOS |
| 12V Operation | NP | NP | P | | | | | | CMOS/NMOS |
| Normal Operation | P | P | NP | | | | | | CMOS/NMOS |
| INPUT OPTION | | | | | | | | | |
| Normal Inverter | | | | | | | | 0 | 0 | CMOS |
| Schmitt Inverter | | | | | | | | 0 | 1 | CMOS |
| Std. TTL Input | | | | | | | | 0 | 0 | NMOS |
| High Voltage Input | | | | | | | | 1 | 0 | NMOS |

Figure 3:
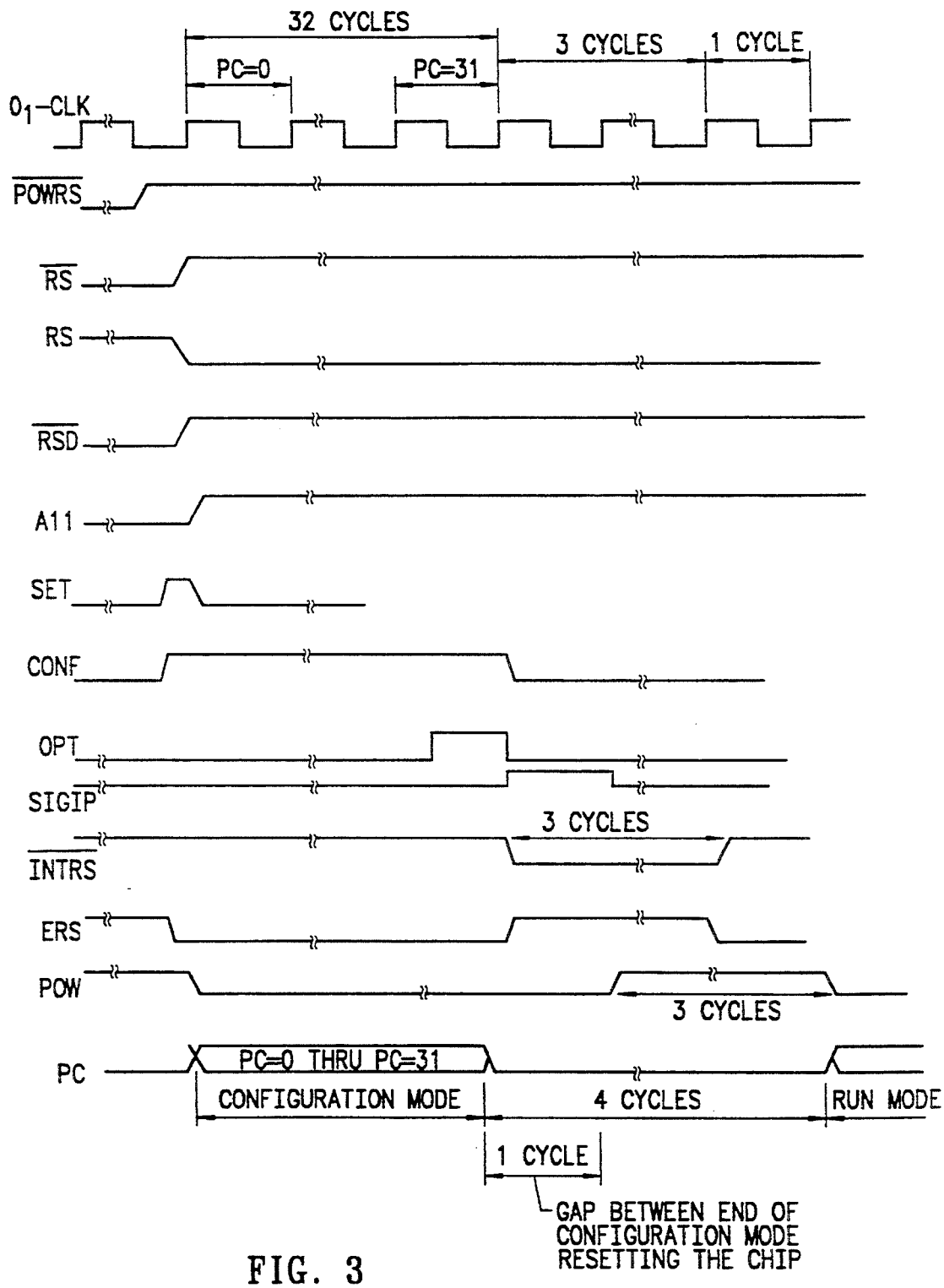
FIG. 3 is a timing diagram illustrating the waveforms associated with operation of a configurable emulator system in accordance with the present invention.

Referring back to FIG. 1 and to the corresponding FIG. 3 waveforms, configuration data are loaded from the configuration data section of PROM 12 into configuration latches/decoders during the first thirty-two clock cycles after emulator configuration system 10 is reset. That is, configuration logic 18 within system 10 responds to an externally generated reset signal RESET by asserting a configuration flag CONFIG. As the CONFIG flag is asserted, emulator configuration system 10 enters a configuration mode by switching bus selector 20 to provide input data received at its input port D to its Q0 output port. The configuration flag CONFIG is also asserted to the A11 address pin of PROM 12 to designate the configuration data section of PROM 12 for read access.

As stated above, emulator configuration system 10 remains in the configuration mode for thirty-two cycles of the instruction clock following reset. After this thirty-two cycle configuration period, the configuration flag CONFIG goes low and, four instruction cycles later, emulator configuration system 10 enters into an emulating mode, switching bus selector 20 to provide data received at its input port D to its Q1 output port to run the user control code stored in locations 0 through 2067 in PROM 12.

During the last three cycles of the four intermediate cycles between the end of the configuration mode and the beginning of the emulating mode, emulator configuration system 10 is internally reset by an internal reset signal INTRS which is generated by configuration logic 18 when the configuration flag CONFIG goes low.

With continuing reference to FIG. 1, clock logic 22 provides a periodic output signal $\overline{AD/DATA}$ both to the enable input $\overline{CE}$ of PROM 12 and to the clock input $\overline{CLK}$ of address latch 14. Address latch 14 clocks an 8-bit address portion received on the I/O bus from IP port 24 to the least significant bit (LSB) address inputs A0–A7 of PROM 12. Thus, program counter 26 of emulator system 10 generates input addresses A0–A10, LSB bits A0–A7 being provided through the IP port 24, when the output $\overline{AD/DATA}$ of clock logic 22 is high. PROM 12 provides the 8-bit contents of the accessed storage location on data bus D0–D7 when the output $\overline{AD/DATA}$ of clock logic 18 is low.

As stated above, when emulator system 10 is in the configuration mode, i.e. when the CONFIG flag is set and asserted to pin A11 of PROM 12, configuration data is provided from the output pins D0–D7 of PROM 12 to the Q0 output port of bus selector 20 via IP port 24 and, thus, to the configuration latches/decoders via configuration bus C-BUS. Access to the appropriate configuration latch/decoder 16A–16N is determined by a 5-bit access address placed on the address bus PC ADDRESS by program counter 26.

The program counter provides address bits A0–A10 which reset to zero with either an external reset signal input or with an internally generated reset signal INTRS. As stated above, the CONFIG bit provides address bit A11. Therefore, as the chip is externally reset and the CONFIG flag is asserted, the first address coming out of the emulator configuration system 10 becomes binary 100000000000 or decimal 2048. This address value addresses the first byte of configuration data. When the CONFIG flag goes up, zeroes are pushed into instruction bus IBUS. Thus, the processor sees Hex 00 in its instruction register, thinks it is a CLRA instruction and correspondingly increments the program counter 26 by one every instruction cycle. As the program counter 26 increments by one, the PROM 12 sees incoming addresses traversing from decimal 2048 through 2079 in 32 instruction cycles. On the last address, the last address detector circuit included in the FIG. 4A configuration logic (described in greater detail below) turns on and proceeds to kill the CONFIG flag as the next instruction cycle begins. Also, it produces an internal reset signal INTRS for the next three cycles. The internal reset signal INTRS resets bits A0–A10 of the program counter 26 to zeroes. With the CONFIG flag set to zero, the address seen by PROM 12 is now totally controlled by bits A0–A10 of the program counter 26 and the system is in the emulation mode.

When in the emulation mode, data provided by the PROM 12, the data now comprising instructions from the user control code, is channelled to the Q1 output port of bus selector 20 and, thus, to instruction execution logic 28, via instruction bus IBUS.

The configuration latches/decoders control the instruction set of the master emulator device. Certain microcontroller architectures will have fewer instructions than others. The configuration latches/decoders recognize which architecture is being emulated from the configuration latches/decoders at address P4–P0=00000 and tailors the effective instruction set by deactivating part of the instruction decoder PLA.

During the configuration mode, the instruction bus IBUS is grounded. During the emulating mode, the configuration bus C-BUS is grounded.

As stated above, the configuration data loaded into the configuration latches/decoders define the architecture of the master emulator device to be consistent with that of a selected microcontroller architecture to be emulated.

FIGS. 4A and 4B1, 4B2, and 4B3 combined to provide a logic diagram of an implementation of configuration logic 18.

As shown in FIG. 4A, five bits of the address provided by program counter 26 on the PC ADDRESS bus are applied to the five inputs P0–P4 of precharge decoder 30. Precharge decoder 30 operates in response to phase clock input PHIISP; at the precharge condition, the output OPT of decoder 30 equals logic low. The reset signal RS, through a master-slave flip-flop and a NOR gate network, makes a one-shot pulse circuit. When the emulator system 10 is externally reset, it produces a one instruction cycle long pulse to set the CONFIG flag. The precharge decoder 30 detects the last configuration address and produces a pulse to reset the CONFIG flag. Subsequently, it produces an internal reset signal INTRS to reset the program counter 26 back to 0.

FIGS. 4B1, 4B2, and 4B3 shows the input/output portion of the configuration logic 18. Bach I/O block 34 responds to a tri-state control input IPDIS. When input IPDIS=1, then the I/O block 34 is in the input mode; that is, the inputs to each I/O block are clocked with the rising edge of the PHI1 clock to the IP2N outputs. Clock transfer gate 36 transfers the eight inputs received from the I/O blocks 34 to the eight transfer gate outputs when clock signal PHI2 goes high.

The outputs of transfer gate 36 are provided to the input port E of each of a series of latches 38. For each latch, when its C input goes high, the signal at its input E flows to its output OUT; when the C input goes low and the P input goes high, then the data is latched and the E input is disconnected from the output OUT.

The outputs X0–X7 of the latches 38 provide the inputs to a transfer gate 32 which is similar to transfer gate 36, transferring the X0–X7 inputs to its outputs TROUT0–7 when the PHI2 clock goes high.

Figure 5:
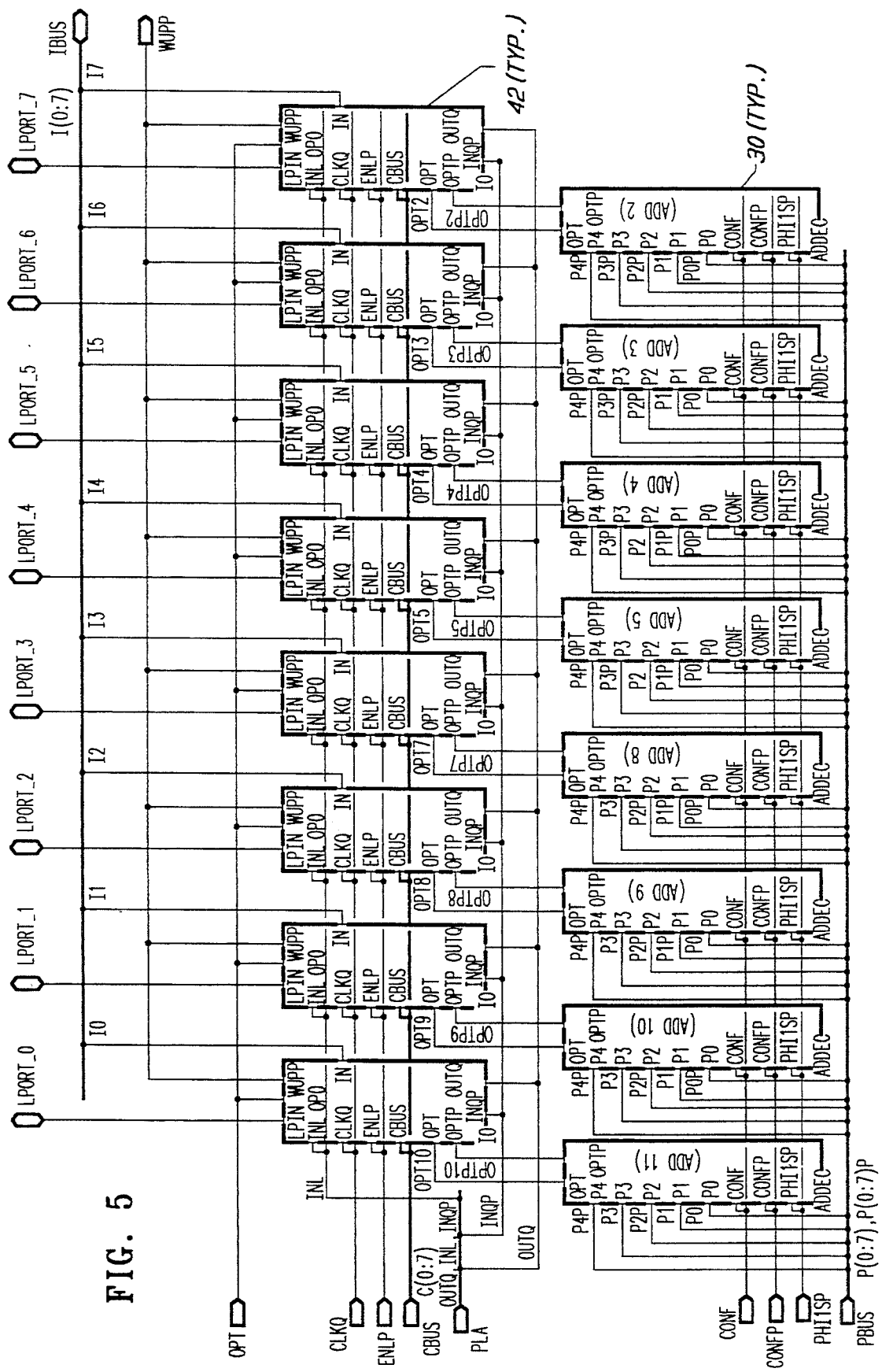
FIG. 5 is a schematic diagram illustrating LPort logic utilizable in the FIG. 1 emulator system.

FIG. 5 provides a schematic diagram of one of the configuration ports, L-port 16N. It includes a series of input/output blocks 42 and a series of decoders 30, which are similar to the decoders 30 described above in conjunction with the configuration logic 18.

Figure 6:
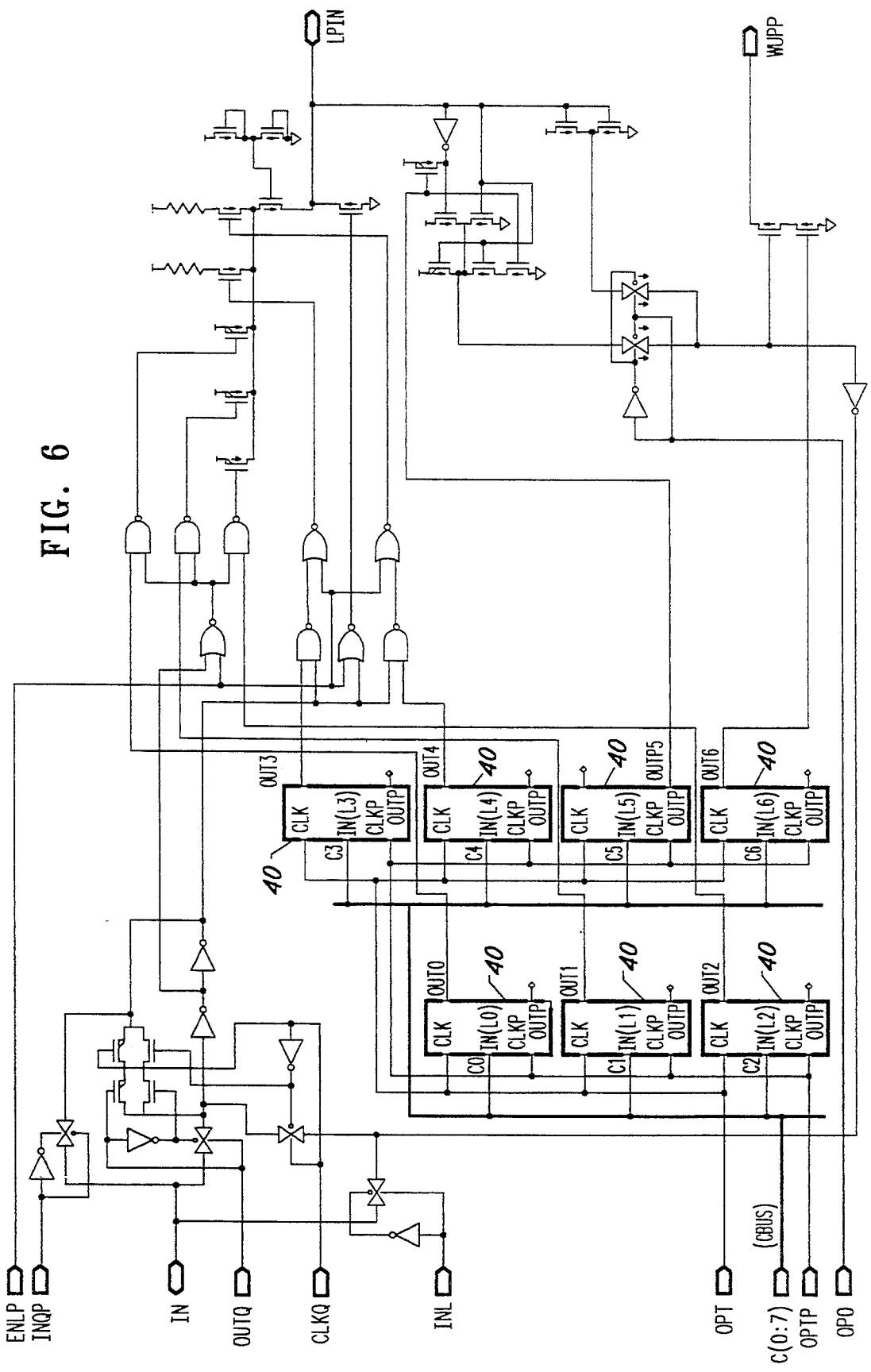
FIG. 6 is a schematic diagram illustrating a LIO input/output block utilizable in the FIG. 5 LPort logic.

A representative input/output block 42 is shown in greater detail in FIG. 6. Each input/output block 42 includes seven latches 40. Configuration data provided on a configuration bus C-BUS (C0–C7) provide the inputs to the seven latches 40. The outputs of the latches 40 set the logic of this portion of the master emulator device to determine the state of the master device outputs LPIN. As shown in FIG. 5, the output pins LPIN of the eight input/output blocks 42 define the state of the master device output port Lport, i.e., outputs LPORT0–7.

Figure 7:
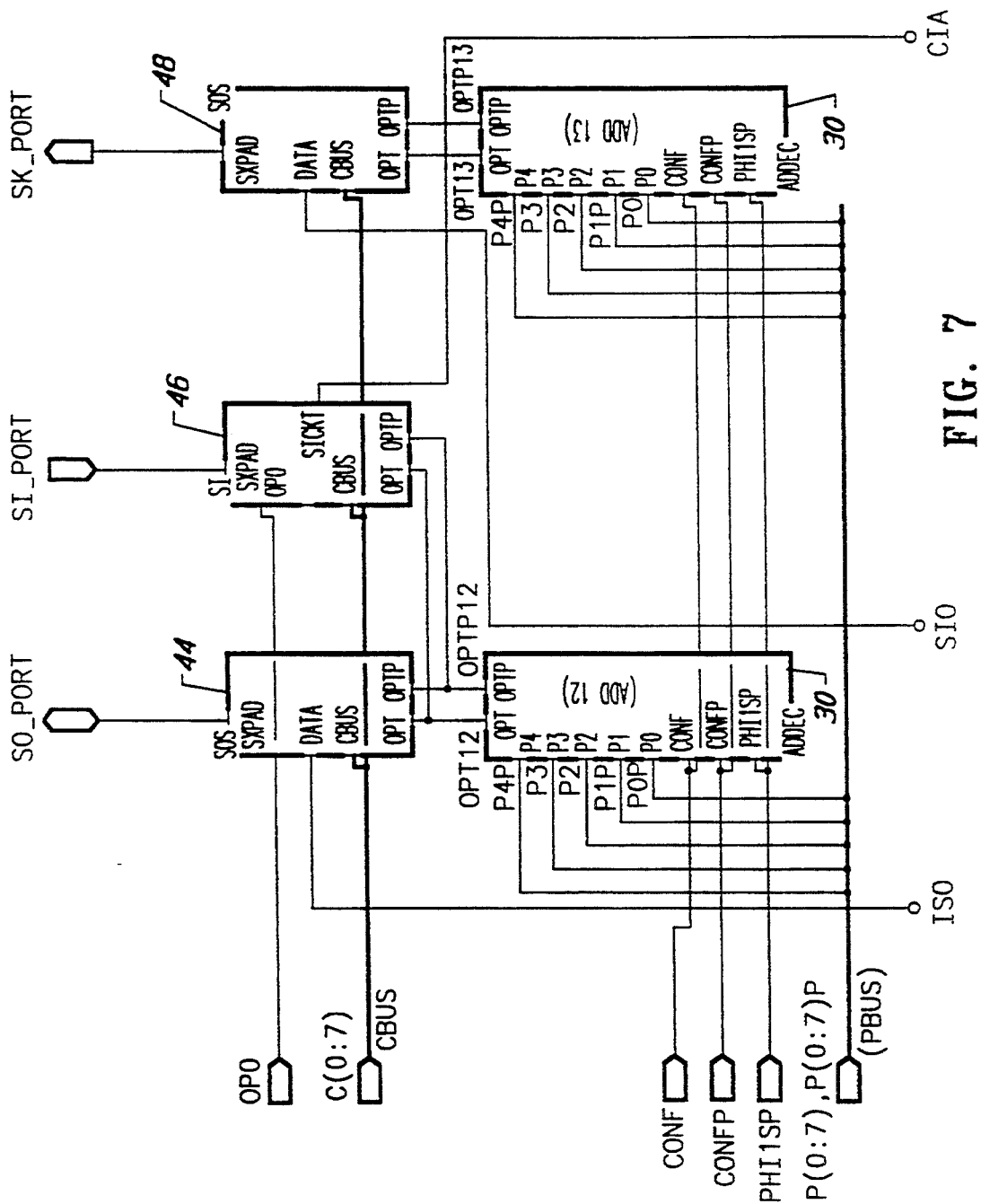
FIG. 7 is a schematic diagram illustrating a SISOSK port utilizable in the FIG. 1 emulator system.

FIG. 7 provides a schematic diagram of SISOSK port 16(N-1) of the master emulator device. As shown in FIG. 7, port 16(N-1) includes a pair of decoders 30 which respond to the address provided at the PC address bus (PBUS) by providing a control signal (OPT12, OPTP12) to the input/output blocks 44, 46, 48, which respectively provide input/output SO-PORT, input SI-PORT and output SK-PORT of port 16(N-1).

Figure 8:
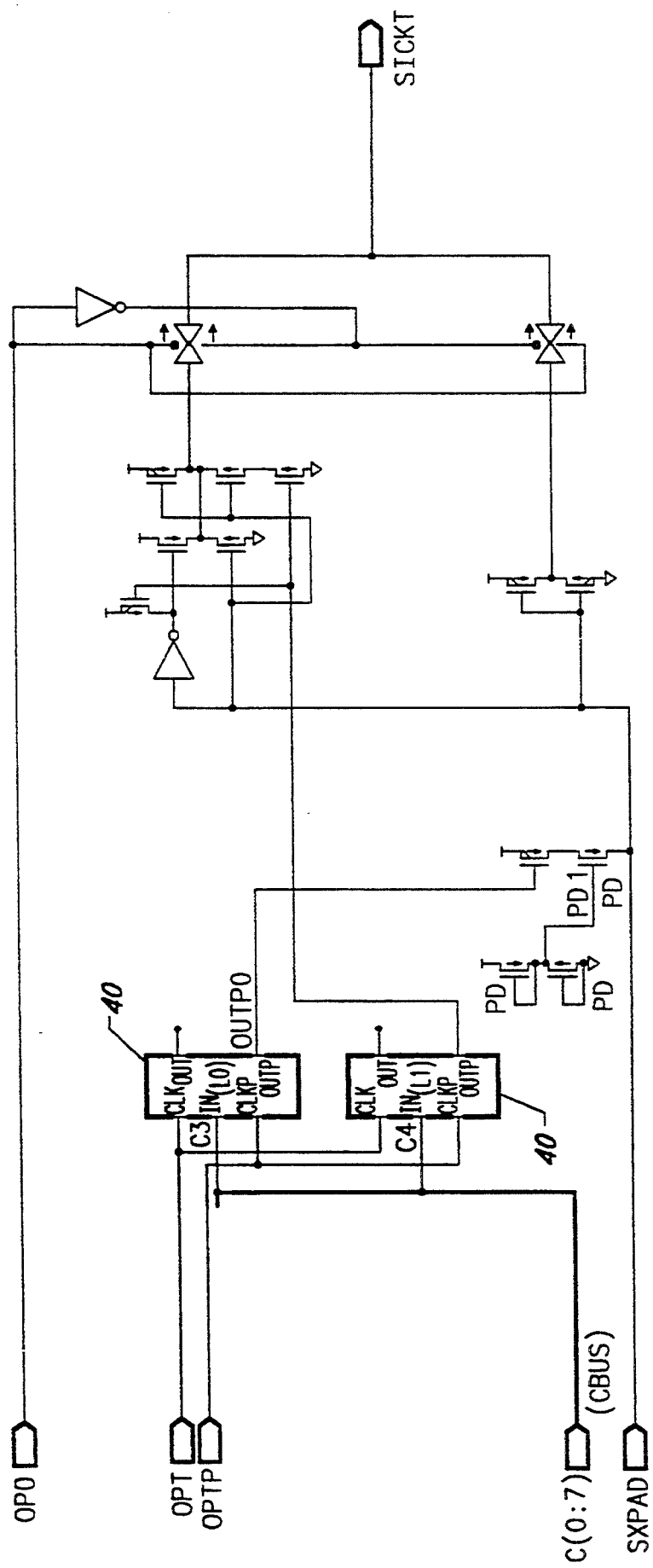
FIG. 8 is a schematic diagram illustrating a SI block utilizable in the FIG. 8 SISOSK port.

The SI-PORT input block 46 is shown in greater detail in FIG. 8. As shown in FIG. 8, the C3 and C4 bits of the configuration data provided on the configuration bus CBUS (C0–C7) are provided to respective latches 40. Each latch 40 enters data when its clock input CLK goes high. When the clock CLK goes low, the data is latched. The input is transferred to the output when the clock is high. Thus, the outputs of the two latches 40 determine the state of the SICKT output of the SI-PORT input block 46. The SICKT output is directed to the ALU of the master emulator device.

Figure 9:
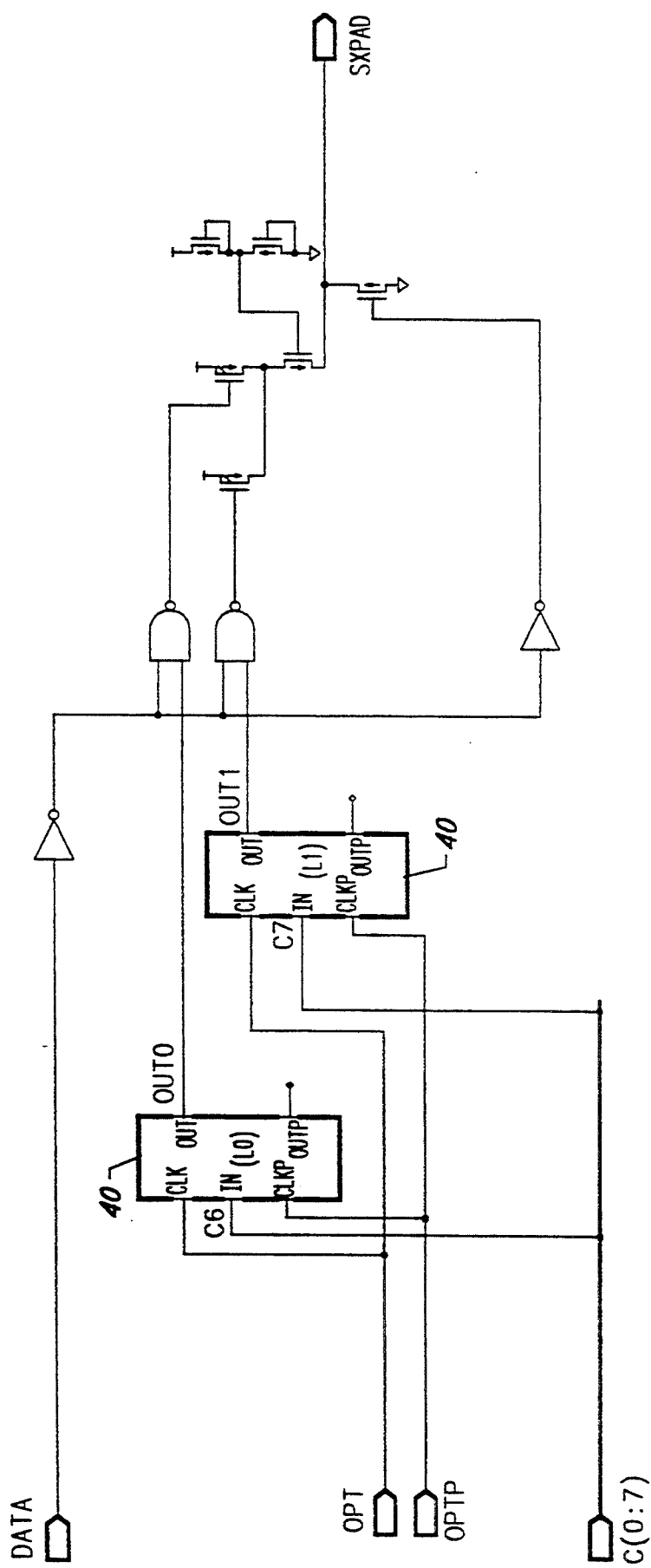
FIG. 9 is a schematic diagram illustrating a SOS output block utilizable in the FIG. 8 SISOSK port.

SK-PORT output block 48 is shown in greater detail in FIG. 9. The two latches 40 of the block 48 receive the C6 and C7 bits of the configuration data provided on the configuration bus C-BUS. The DATA input to block 48 is a clock for shifting data for a serial register in the master emulator device. The outputs of the two latches 40 determine the state at the SXPAD, or SK-PORT output, output of block 48.

Figure 10A:
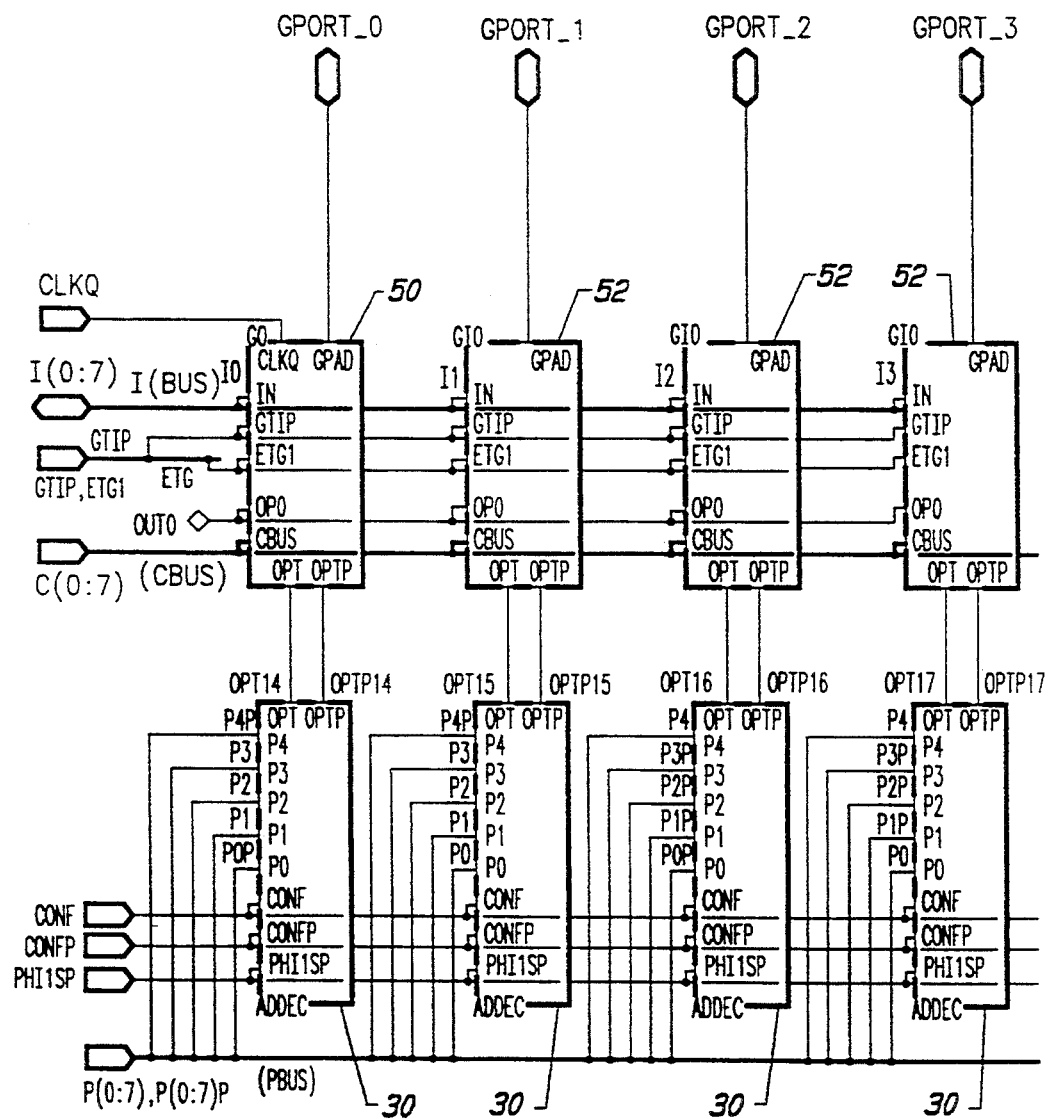
FIGS. 10A and 10B together is a schematic diagram illustrating GPort logic utilizable in the FIG. 1 emulator system.
Figure 10B:
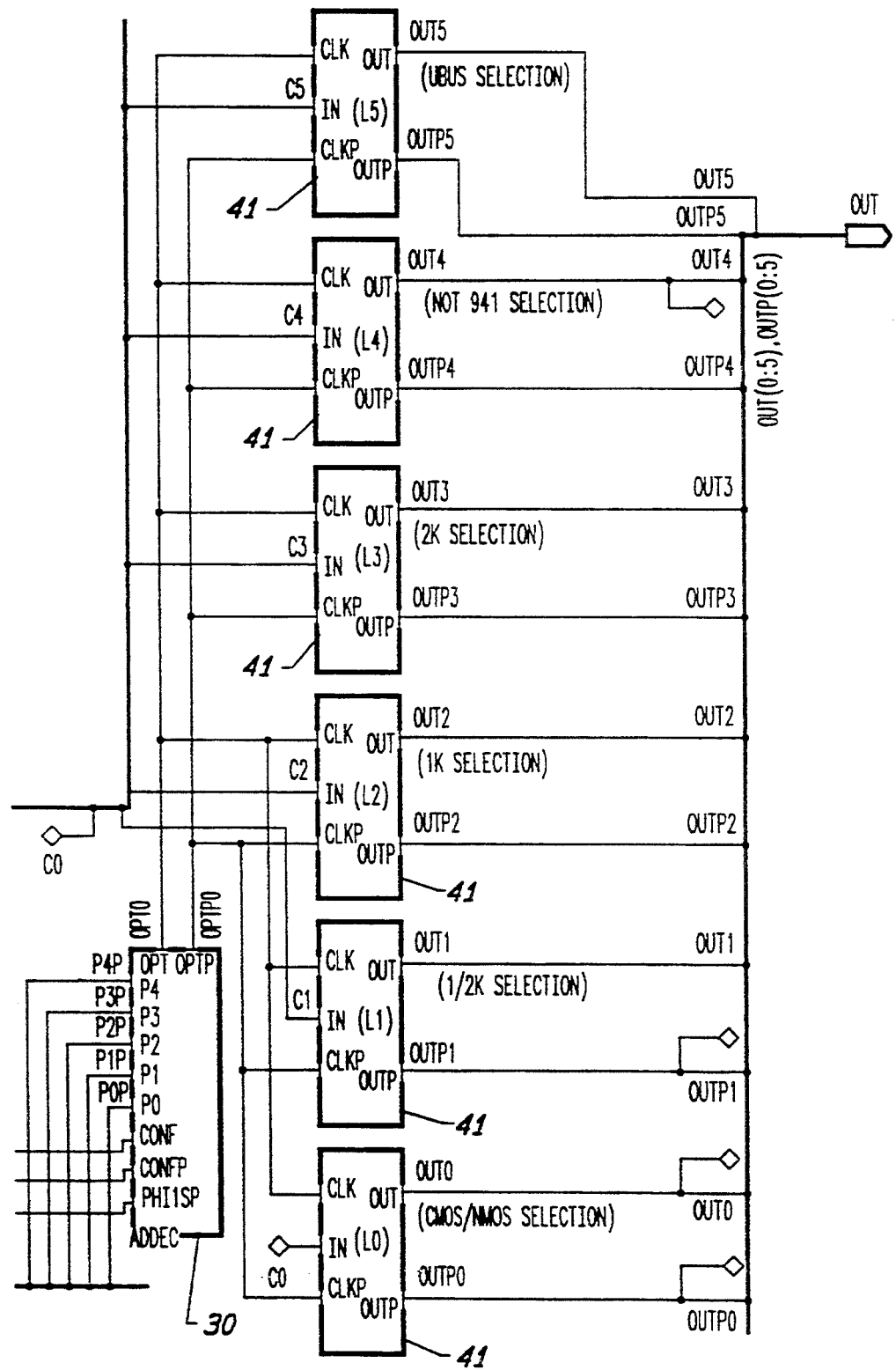

The G-port 16A is shown in greater detail in FIGS. 10A and 10B. As shown in FIGS. 10A and 10B, configuration latch/decoder 16A includes four groups of logic cells. First, a series of decoders 30 responds to the address provided on the PC address bus to enable the input/output blocks 50, 52 of configuration latch/decoder 16C. A second group of I/O blocks 40, which are described above in conjunction with the description of the configuration logic 18, respond to the configuration data provided on the configuration bus CBUS to provide a five-bit parallel output. These five outputs provide ROM-RAM size, technology type and architectural information to the master emulator device.

Figure 11A:
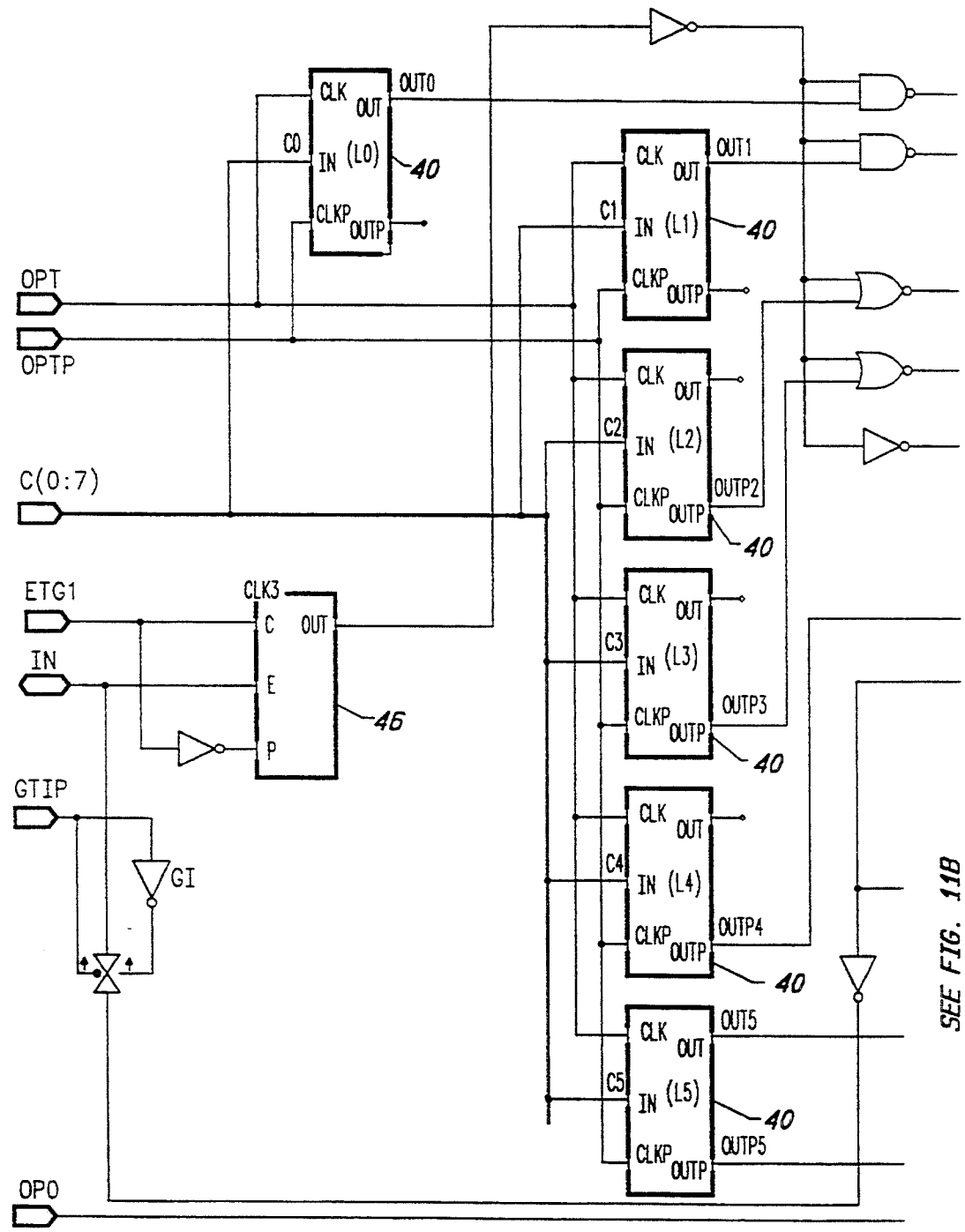
FIGS. 11A and 11B together is a schematic diagram illustrating a GO block utilizable in the FIG. 12 GPort.
Figure 11B:
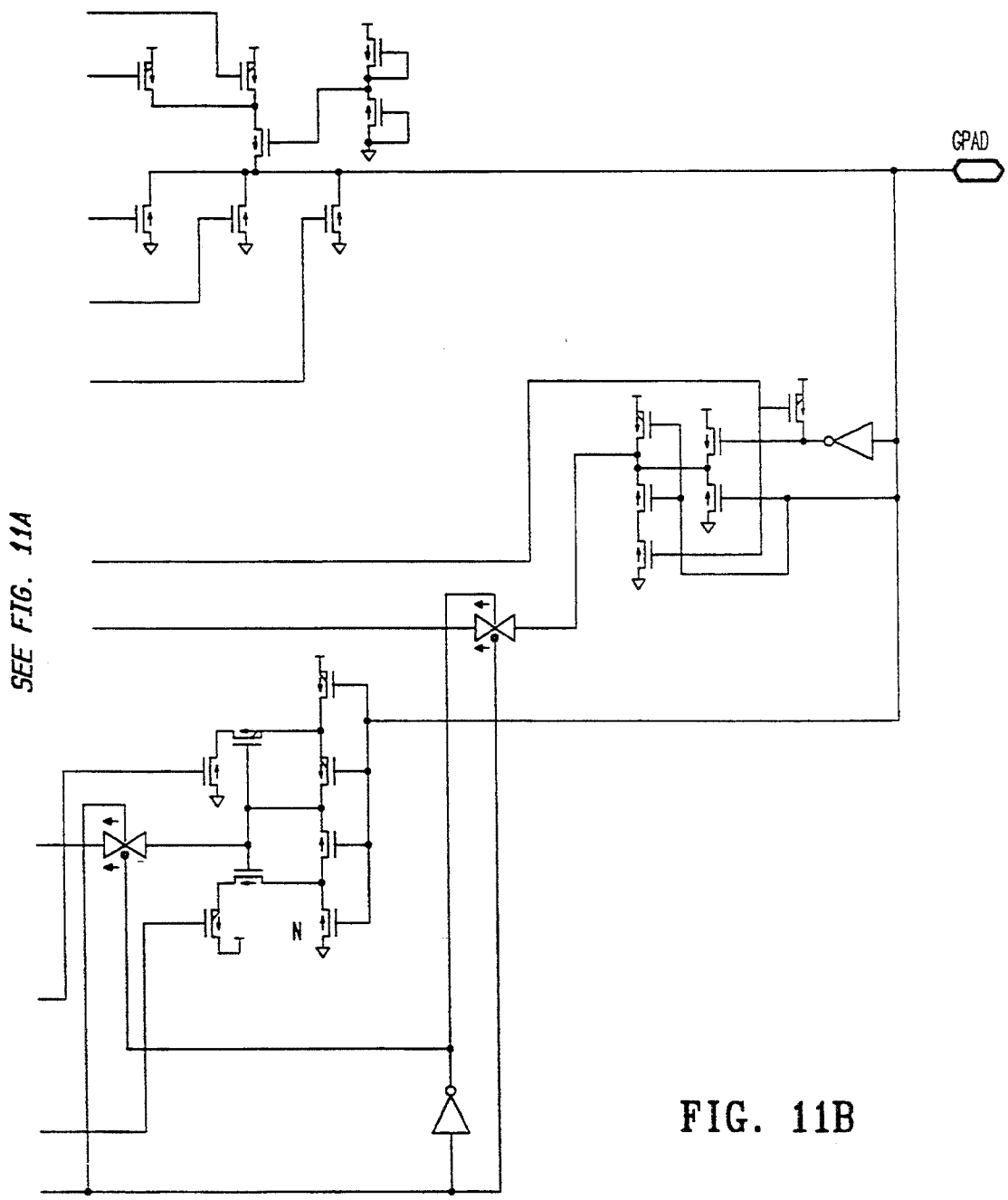

I/O block 50 is shown in greater detail in FIG. 11.

Figure 12A:
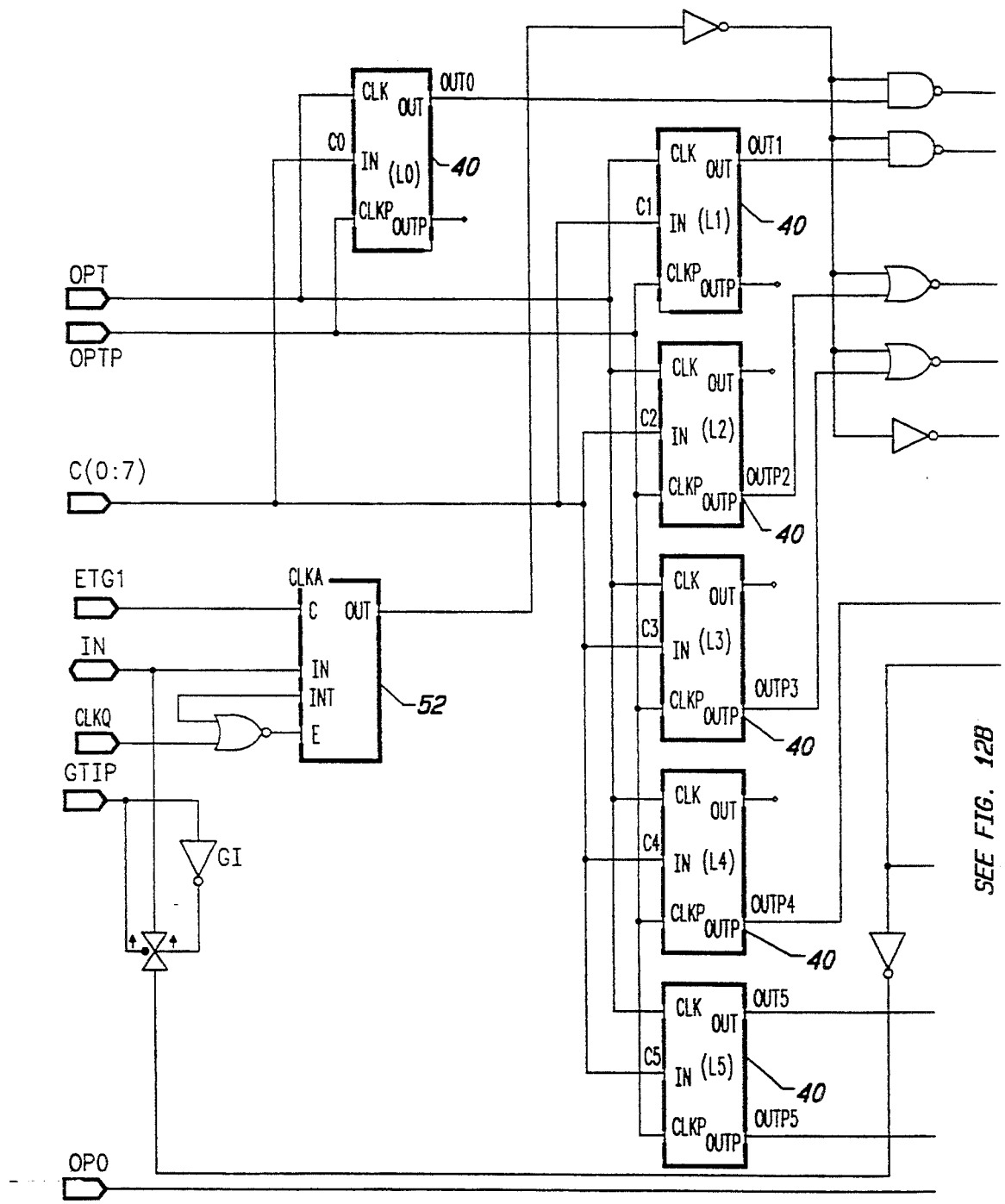
FIGS. 12A and 12B together is a schematic diagram illustrating a GI0 block utilizable in the FIG. 12 GPort.
Figure 12B:
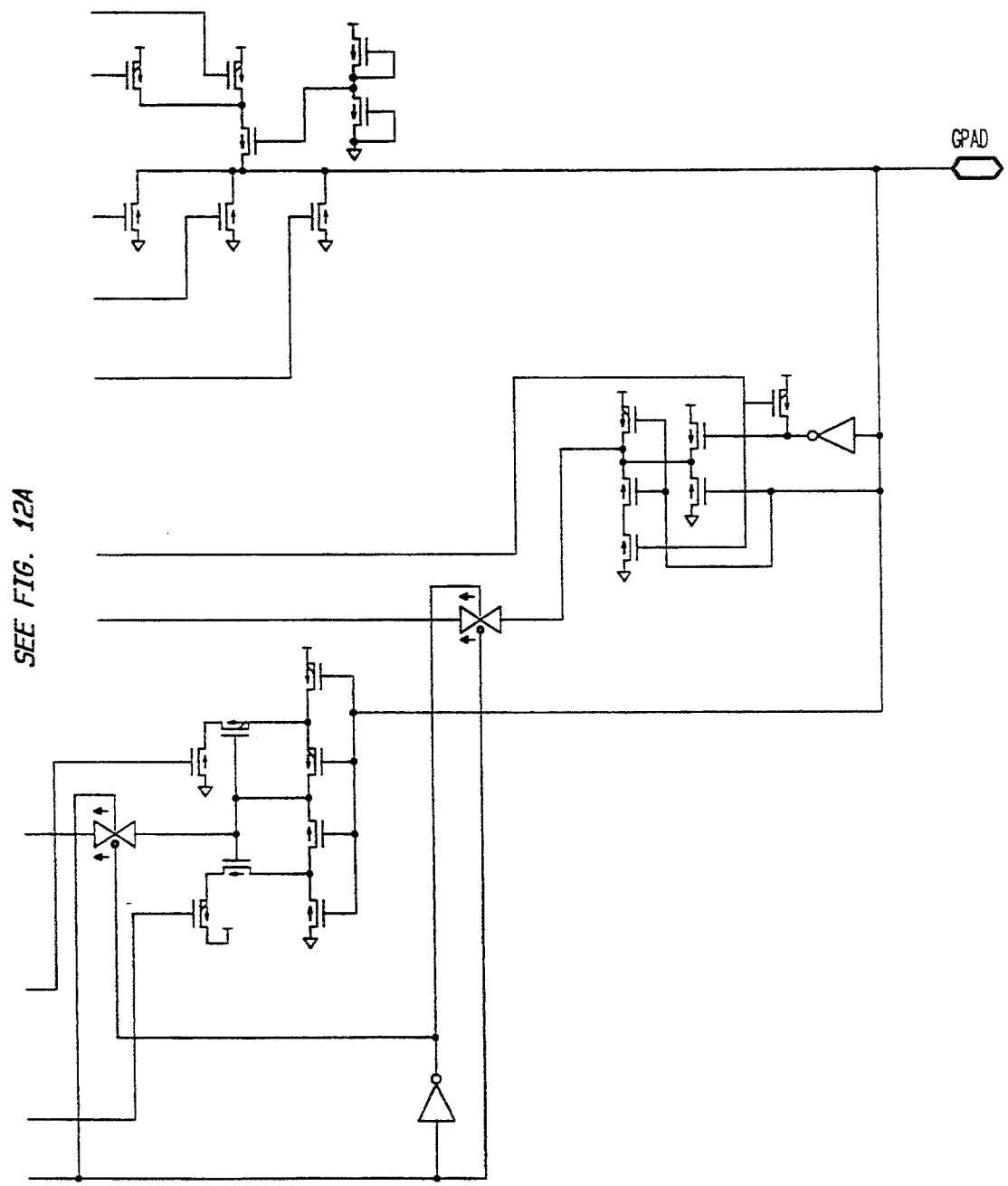

I/O block 52 is shown in greater detail in FIG. 12.

It should be understood that various alternatives to the embodiments of the invention described herein may be employed in practicing the invention. It is intended that the following claims define the scope of the inven-

What is claimed is:

1. An integrated configurable emulator circuit for emulating a microcontroller device architecture selected from a plurality of microcontroller device architectures, the configurable emulator circuit comprising:
   (a) a master microcontroller emulator comprising at least one functional block responsive to a function select input signal for setting the function of the functional block so that the functional block is configured to perform an integrated circuit function selected from a plurality of possible integrated circuit functions to be performed by the functional block, the master microcontroller emulator including means responsive to control code for executing the control code;
   (b) configuration mode assertion means responsive to an external input signal for asserting a configuration flag;
   (c) bus selector means, having a bus selector means input for receiving configuration data or control code and a configuration data output and a control code output, and responsive to the assertion of the configuration flag, for transferring configuration data provided at the bus selector means input to the configuration data output and for otherwise transferring control code provided at the bus selector means input to the master microcontroller emulator via the control code output; and
   (d) at least one configuration latch/decoder responsive to configuration data provided at the configuration data output for providing the function select input signal to the at least one functional block.

2. A configurable emulator circuit for emulating a microcontroller device architecture selected from a plurality of microcontroller device architectures, the configurable emulator circuit comprising:
   (a) configuration mode assertion means responsive to an external signal for asserting a configuration flag;
   (b) bus selector means, having a bus selector means input for receiving configuration data or control code and configuration data output and a control code output, and responsive to assertion of the configuration flag, for transferring configuration data provided at the bus selector means input to the configuration data output and for otherwise transferring control code provided at the bus selector means input to the control code output;
   (c) at least one configuration latch/decoder means responsive to configuration data provided at the configuration data output for providing a function select signal; and
   (d) a master microcontroller emulator that includes at least one functional block, the master microcontroller emulator being responsive to the function select signal such that the functional block is configured to perform an integrated circuit function selected from a plurality of possible integrated circuit functions to be performed by the functional block, the master microcontroller emulator further including means responsive to control code provided to the control code output for executing the control code.

3. An integrated configurable emulator circuit for emulating a microcontroller device architecture selected from a plurality of microcontroller device architectures, the configurable emulator circuit comprising:
   (a) a programmable memory element that includes a first section comprising a plurality of storage locations for storing configuration data, the programmable memory element having an address input port connected to receive input addresses for accessing corresponding storage locations and an output port connected to a data bus, the programmable memory element responsive to an input address received at its address input port by providing particular configuration data stored in a corresponding storage location to the data bus, the programmable memory element capable of providing configuration data to the data bus only when a configuration flag is asserted;
   (b) a master microcontroller emulator comprising a plurality of functional blocks, each functional block responsive to a corresponding function select input signal for setting a corresponding function of the functional block so that the functional block is configured to perform corresponding desired integrated circuit functions selected from a plurality of possible integrated circuit functions to be performed by the functional block, the master microcontroller emulator including means responsive to control code for executing the control code;
   (c) configuration logic that asserts the configuration flag in response to an external reset signal;
   (d) a bus selector having a bus selector input for receiving configuration data or control code and a bus selector configuration data output and a bus selector control code output that responds to the assertion of the configuration flag by transferring configuration data received from the data bus at the bus selector input to a bus selector configuration data output and otherwise transfers control code received from the data bus at the bus selector input to the master microcontroller emulator via a bus selector control code output; and
   (d) a plurality of configuration latches/decoders responsive to configuration data provided at the configuration data output for providing corresponding function select input signals to the corresponding functional blocks.

* * * * *